United States Patent Office 3,823,229
Patented July 9, 1974

3,823,229
INHALATION COMPOSITIONS CONTAINING 7-($\beta$-HYDROXYPROPYL)-THEOPHYLLINE
Gustaf L. Jederstrom, Bjorklinge, Sweden, assignor to Pharmacia AB, Uppsala, Sweden
No Drawing. Filed Nov. 16, 1971, Ser. No. 199,362
Claims priority, application Sweden, Nov. 20, 1970, 15,711/70
Int. Cl. A61k 13/00
U.S. Cl. 424—45    1 Claim

ABSTRACT OF THE DISCLOSURE

The invention relates to self-propelling aerosol compositions containing a solution of 7-($\beta$-hydroxypropyl)-theophylline.

---

The present invention concerns a composition for the treatment of pulmonary afflictions (for example asthma and chronic bronchitis) by inhalation. More particularly, the invention is concerned with a composition for such treatment comprising a derivative of theophylline, said composition being contained in a pressure resistant container. The invention also encompasses a method for the preparation of the composition.

Attempts have previously been directed to making the theophylline group accessible to treatment of pulmonary affections by inhalation in the form of so-called aerosol preparations. To that effect, special derivatives of theophylline have been combined with solution promotors in order to attain solutions which can be used in aerosol preparations. It must be regarded as a disadvantage to need to add solution promotors to aerosol compositions in order to obtain true solutions that can be dispersed as an aerosol. Such additions are undesired from medical viewpoint and result in increased costs for the preparation of the compositions.

The object of the present invention is to provide a composition that forms a true solution without the addition of solution promotors while maintaining the excellent therapeutical properties of theophylline derivatives.

The present invention is characterized by the feature that the composition to be contained in a pressure resistant container comprises 0.5–5 percent of 7-($\beta$-hydroxypropyl)-theophylline; 0.5–5 percent of water; 5–40 percent of a lower alcohol having 2–3 C-atoms and 50–93 percent of a propellant.

The present invention uses a known technique of preparing solutions adapted for spraying purposes in that the active substance is mixed with a lower alcohol, water and a propellant in suitable proportions (vide U.S. Pat. No. 2,868,691). In connection with the establishment of the present invention, other derivatives of theophylline as well as theophylline itself have been tested as ingredients in the composition known by the U.S. patent specification. In this connection it has been found that the hydrochloride of theophylline does not form a true solution with the mixture of water, lower alcohol and propellant in proportions used according to the invention at therapeutically acceptable pH-values. The 2,3-dihydroxypropyl derivative of theophylline is not capable of forming a solution by using the known technique, either.

7-($\beta$-hydroxypropyl)theophylline is a known substance (vide The Merck index of chemicals and drugs. 7 Edition Rahway, N.J., U.S.A. page 545). It has, however, not previously been used in inhalation preparations. The reason for the compound having been found suitable for an inhalation preparation is probably that the 2-hydroxypropyl group splits the electrone system of the theophylline molecule in a suitable manner which is in contrast to other effects resulting from the conversion into salt form.

As lower alcohols, containing 2–3 carbon atoms, mention should preferably be made of ethyl alcohol and isopropanol. As a propellant mention should mainly be made of non-toxic liquid propellants which may be fluoro and/or chloro substituted lower saturated aliphatic hydrocarbons, especially alkanes containing no more than 2 carbon atoms and at least 1 fluoro atom and mixtures thereof. Particularly suitable compounds are dichloro difluoromethane (Freon 12) and dichlorotetrafluoroethane (Freon 114).

The composition comprises 0.5–5 percent of 7-($\beta$-hydroxypropyl)theophylline, for example 0.7–4 percent, preferably 1–4 percent of 7-($\beta$-hydroxypropyl)theophylline, for example, 1–3 percent.

The composition comprises 0.5–5 percent of water, preferably 0.6–3 percent of water.

The composition comprises 5–40 percent of a lower alcohol having 2–3 C-atoms, preferably 12–25 percent of said alcohol.

The composition comprises 50–93 percent of a propellant, for example 67–86 percent of said propellant.

The composition may, thus, comprise 1–4 percent of 7-($\beta$-hydroxypropyl)theophylline; 0.6–3 percent of water; 12–25 percent of a lower alcohol having 2–3 C-atoms; and 67–86 percent of a propellant.

The propellant may, for example, be a mixture of dichlorodifluoromethane and dichlorotetrafluoroethane. For example the content of dichlorodifluoromethane may be 40–60 percent and the content of dichlorotetrafluoroethane may be 25–40 percent counted on the whole composition.

The invention also encompasses a method for the preparation of a composition for the treatment of pulmonary afflictions by inhalation in which a derivative of theophylline is transformed into a pressure resistant container, the improvement which comprises mixing 0.5–5 percent of 7-($\beta$-hydroxypropyl)theophylline in arbitrary order with 0.5–5 percent of water; 5–40 percent of a lower alcohol having 2–3 carbon atoms and 50–93 percent of a propellant and transforming the mixture thus obtained into the pressure resistant container.

In order to more clearly disclose the nature of the present invention, the following examples illustrating compositions in accordance with the invention will now be described. In the claims which follow and in the specification, the quantities of material are expressed in terms of percentages by weight of the total composition.

EXAMPLE 1

A mixture of the following ingredients was made up:

|   | G. |
|---|---|
| 7-($\beta$-hydroxypropyl)theophylline | 1 |
| Water | 1 |
| Ethyl alcohol | 20 |
| Dichlorodifluoromethane to 100 g. | |

The mixture obtained was a clear and durable solution. It was transformed into a pressure resistant container which was closed by a closing valve. The preparation obtained was excellently suitable as an inhalation agent for the treatment of pulmonary affections. On discharging the composition from the container, there was obtained an aerosol which gives particles having excellent resorption properties in the respiratory tract.

EXAMPLE 2

A mixture of the following ingredients was made up:

|   | G. |
|---|---|
| 7-($\beta$-hydroxypropyl)theophylline | 1 |
| Water | 4 |
| Ethyl alcohol | 30 |
| Dichlorodifluoromethane to 100 g. | |

EXAMPLE 3

A mixture of the following ingredients was made up:

| | G. |
|---|---|
| 7-(β-hydroxypropyl)theophylline | 1 |
| Water | 1.5 |
| Ethyl alcohol | 20 |
| Dichlorodifluoromethane | 32 |
| Dichlorotetrafluoromethane to 100 g. | |

The mixture obtained had good properties for inhalation therapy.

EXAMPLE 4

A mixture of the following ingredients was made up:

| | G. |
|---|---|
| 7-(β-hydroxypropyl)theophylline | 1 |
| Water | 3 |
| Ethyl alcohol | 30 |
| Dichlorodifluoromethane | 48 |
| Dichlorotetrafluoroethane to 10 g. | |

The mixture obtained had good properties for inhalation therapy.

EXAMPLE 5

A mixture of the following ingredients was made up:

| | G. |
|---|---|
| 7-(β-hydroxypropyl)theophylline | 1 |
| Water | 1.5 |
| Ethyl alcohol | 20 |
| Dichlorodifluoromethane | 48 |
| Dichlorotetrafluoroethane to 100 g. | |

The mixture obtained had similarly excellent properties as given in example 1.

The mixture was converted into an inhalation preparation as in example 1. The aerosol formed on discharging the mixture gives particles of such sizes and composition (moist and dry) that on inhalation they are carried by the inhalation air to penetrate into the narrow passages of the respiratory tract where they are mainly resorbed.

An investigation of the particle size distribution of the discharged aerosol by a so-called CI–S–6 Cascade Impactor proved that 80 percent of the particles had a diameter less than 5 μm.

EXAMPLE 6

A mixture of the following ingredients was made up:

| | G. |
|---|---|
| 7-(β-hydroxypropyl)theophylline | 4.5 |
| Water | 2.0 |
| Ethyl alcohol | 23.5 |
| Dichlorodifluoromethane | 70.0 |

The mixture obtained had good properties for inhalation therapy.

What I claim is:

1. A self-propelling pharmaceutical composition capable of providing a medicament in aerosol form suitable for inhalation therapy consisting of a solution of
   (a) 1–4.5 wt. percent of 7-(β-hydroxypropyl)-theophylline;
   (b) 1–4 wt. percent of water,
   (c) 20–30 wt. percent of ethyl alcohol and
   (d) 50–93 wt. percent of a mixture of dichlorodifluoromethane and dichlorotetrafluoroethane, the content of dichlorodifluoromethane being 40–60 percent and the content of dichlorotetrafluoroethane being 25–40 percent, said solution being free of solution promoters other than water and the lower alcohol.

References Cited

UNITED STATES PATENTS

| 2,868,691 | 1/1959 | Porush et al. | 424—45 |
| 3,039,929 | 6/1962 | Stanko | 424—45 |
| 3,304,230 | 2/1967 | Abramson | 424—45 |
| 3,322,625 | 5/1967 | Shimmin | 424—45 |

FOREIGN PATENTS

| 1,132,933 | 11/1968 | Great Britain. |

OTHER REFERENCES

Merck Index 7th Edition, 1960, p. 545.

ALBERT T. MEYERS, Primary Examiner

N. A. DREZIN, Assistant Examiner

U.S. Cl. X.R.

424—253